US007327919B1

(12) United States Patent
Ko

(10) Patent No.: US 7,327,919 B1
(45) Date of Patent: Feb. 5, 2008

(54) FIBER OPTIC AUDIO CABLE

(76) Inventor: Jimmy Ko, 428 McCormick St., San Leandro, CA (US) 94577-1005

( * ) Notice: Subject to any disclaimer, the term of this patent is extended or adjusted under 35 U.S.C. 154(b) by 0 days.

(21) Appl. No.: 10/877,594

(22) Filed: Jun. 25, 2004

(51) Int. Cl.
*G02B 6/44* (2006.01)

(52) U.S. Cl. ...................... 385/101; 385/100; 398/140; 398/141

(58) Field of Classification Search ................ 398/140, 398/141; 385/100–114; 174/70 R
See application file for complete search history.

(56) References Cited

U.S. PATENT DOCUMENTS

| | | | | |
|---|---|---|---|---|
| 4,282,605 | A | 8/1981 | Bose | 455/617 |
| 4,715,671 | A | 12/1987 | Miesak | 350/96.1 |
| 4,945,806 | A | 8/1990 | Merrill, Jr. | 84/645 |
| 4,956,877 | A * | 9/1990 | Kroll et al. | 398/170 |
| 5,483,367 | A | 1/1996 | Han | 359/124 |
| 5,483,371 | A | 1/1996 | Farinelli, Jr. | 359/146 |
| 5,564,942 | A | 10/1996 | Lee | 439/462 |
| 5,676,565 | A | 10/1997 | Vagnoni | 439/580 |
| 6,101,038 | A * | 8/2000 | Hebert et al. | 359/618 |
| 2005/0198674 | A1* | 9/2005 | Lin et al. | 725/78 |

FOREIGN PATENT DOCUMENTS

| | | | |
|---|---|---|---|
| JP | 07123051 | A * | 5/1995 |
| JP | 09200840 | A * | 7/1997 |

OTHER PUBLICATIONS

"Toshiba—Fiber-Optic Devices TOSLINK Product Guide," Toshiba America Electronic Components, Inc., Irvine, CA, 2001.

* cited by examiner

*Primary Examiner*—Sung Pak
*Assistant Examiner*—Daniel J Petkovsek
(74) *Attorney, Agent, or Firm*—Saile Ackerman LLC; Stephen B. Ackerman; Billy Knowles

(57) ABSTRACT

A signal transmission media for transmission of signals such as audio and/or video from a transmission apparatus to a receiving apparatus. The signal transmission media has a first connector in contact with the transmission apparatus to receive the signal and is communication with a first signal converter to acquire the signal and then convert the signal to a modulated light signal which is transferred from the first signal converter to a fiber optic cable for transmission. A second signal converter receives the modulated light signal from the fiber optic cable and re-converts the modulated light signal to the signal, which is then transferred to a second connector. The second connector is in contact with the receiving apparatus to transfer the re-converted signal to the receiving apparatus. A power amplifier may be placed between the second signal converter and the second connector to amplify the reconverted signals for reproduction.

84 Claims, 6 Drawing Sheets

FIBER OPTIC AUDIO CABLE

BACKGROUND OF THE INVENTION

1. Field of the Invention

This invention relates generally to sound reproduction systems. More particularly, this invention relates to transmission media such as cables used for the transference of audio signals from sound generation sources such as compact disc, digital video disk players, microphones, and acoustic pickups or transducers on musical instruments to amplifiers and speaker for sound reproduction. Even more particularly, this invention relates to the transfer of audio signals by way of fiber optic cables.

2. Description of Related Art

Audio/Visual systems such as home entertainment systems or sound reproduction systems for theaters and auditoriums must transfer audio and/or video signals from sound and video generation equipment to speakers or video displays. The most common connector utilized for connecting these audio and video systems, is what is commonly referred to as an "RCA" connector, variations of which are described in U.S. Pat. Nos. 5,564,942 (Lee) and 5,676,565 (Vagnoni). The "RCA" connector consists of a cylindrical member adapted for connection at one end to a cable and having a pin and a contact, or ground, sleeve projecting from the other end. The pin engages in a corresponding socket in a terminal, or jack, to form the "positive" connection. The contact sleeve extends over a cylindrical flange of the jack in an interference fit to form the "negative", or ground, connection. As a result, current can flow to the audio/visual reproduction devices from the audio/visual generation equipment connected to the other end of a cable connected between two of the "RCA connectors. The "RCA connector" is a common term that is also referred to commonly as "audio jack connectors", "phone-connectors", and the like.

Monster Cable Products, Inc., Brisbane, Calif. is a manufacturer of high performance cables that connect audio/video components for home, car and professional use. Many of the cable types manufactured by companies such as Monster Cable Products employ the RCA s attached to specialty cables for the transfer of audio and video signals. However, if the audio and/or video generation devices are at a great distance (>10 m) from the speakers or the video displays, the signal quality is degraded. Electronic noise from induced electronic noise, from ground differentials, and from the electrical characteristics of the cables themselves contributes to the lower quality signal. This limits the distance of that the audio and/or video generation devices are from the speakers and/or the video displays.

Often speakers and video displays actually incorporate amplifiers to overcome any losses and to attempt to recover and eliminate any distortion accumulated in the transmission over large distances. Some entertainment systems even employ fiber optic transmission devices to isolate the generation devices from the reproduction devices. TOSLINK from Toshiba America Electronic Components, Inc, Irvine, Calif. and described in the "Toshiba-Fiber-Optic Devices TOSLINK Product Guide", Toshiba America Electronic Components, Inc, Irvine, Calif., 2001 is a fiber optical link that is employed in consumer entertainment systems for the transmission of the digitally encoded audio data from a compact disc to a receiver. Toshiba manufactures the transmitters and receivers that are incorporated in consumer equipment such as compact disc players and audio amplifiers.

U.S. Pat. No. 4,282,605 (Bose) describes a vehicle sound system that has a power amplifier integrated with a loudspeaker at each of four remote locations. An LED or diode laser transmits an electrical signal from a tuner or tape player at low level modulated on a corresponding light signal over optical fibers to each remote location to a phototransistor that converts the light signal into a corresponding electrical signal that is amplified by the power amplifier and then reproduced by the loudspeakers. Leads from the vehicle battery carry D.C. power to each location for energizing the power amplifiers and phototransistors.

U.S. Pat. No. 4,715,671 (Miesak) details a fiber-optic signal transmission link that is used in place of electric audio cable to inter-connect performing musicians and all the necessary pieces of music processing equipment being used in a performance. The fiber-optic link isolates all the people involved in the performance from potential electrical and physical hazards created by the electric audio cables being used.

U.S. Pat. No. 4,945,806 (Merrill, Jr.) teaches a fiber optic musical instrument digital interface (MIDI). The digital interface is a converter that transforms electrical MIDI signals from an electronic musical instrument (or electronic musical device) into light signals. These light signals travel down a fiber optic cable to another fiber optic MIDI link where they are converted back into their original electrical form and output to another electronic musical instrument (or electronic musical device).

U.S. Pat. No. 5,483,367 (Han) describes an audio system where recovered audio signals from a receiver or a digital recording device are used to re-modulate secondary carrier signals and are transmitted by a light emitting diode to a headphone. A photosensitive receiver is incorporated in the headphones to recover the audio signal for driving the speakers of the headphones.

U.S. Pat. No. 5,483,371 (Farinelli, Jr.) provides a distribution system for audio and video services from a centralized source using lightwave signals generated from terminal equipment through an optical carrier to multiple locations in a facility. The terminal equipment reversibly converts audio, video, and control signals from electrical into lightwave signals. The terminal equipment also provide for electrical output at the remote locations with the appropriate format for various audio and video speakers and displays. A controller selects and converts audio communication signal into a standard audio format and directs the signal to the desired remote location in response to the control signal.

SUMMARY OF THE INVENTION

An object of this invention is to provide a signal transmission media for transmission of signals such as audio and/or video that eliminates a limiting of the location of reproduction devices.

Another object of this invention is to provide a signal transmission media for transmission of signals such as audio and/or video that permits long transmission distances of the signals and allow reproduction of the best quality of the signals.

Further, another object of this invention is to provide a signal transmission media for transmission of signals such as audio and/or video that are not interfered with by the electrical or magnetic fields during transmission.

To accomplish at least one of these objects a signal transmission media such as an audio signal cable communicates a signal such as an audio and/or video signal from a signal transmission apparatus to a receiving apparatus. The signal transmission media has a first connector in contact with the signal transmission apparatus to receive the signal.

The signal transmission apparatus may be audio signal source(i.e. a microphone, compact disk player (CD), a musical instrument audio pickup, or digital video disk (DVD), a digital-to-analog converter, or an audio preamplifier. Similarly, the receiving apparatus is the digital-to-analog converter, the audio preamplifier, or an audio amplifier.

The first connector is communication with a first signal converter to acquire the signal and then convert the signal to a modulated light signal. The first signal converter and said first connector have no external cabling between them. The modulated light signal is transferred from the first signal converter to a fiber optic for transmission. A second signal converter is connected to receive the modulated light signal from the fiber optic cable. The second signal converter then re-converts the modulated light signal to the signal. The second signal converter and the second connector have no external cabling between them. A second connector is connected to an output of the second signal converter to receive the re-converted signal and in contact with the receiving apparatus to transfer the re-converted signal to the receiving apparatus.

The first and second connectors are RCA audio connectors in the preferred embodiment. In a second embodiment, the first and second connectors are XLR audio connectors as described in the Audio Engineering Society, Inc. standard AES14-1992 (r2004). The signal transmission media further includes a first power connector in contact with a power supply voltage source to provide a power voltage to the first signal converter. Connective wiring from the first power connector to the second signal converter provides the power voltage to the second signal converter. The connective wiring being adjacent to the fiber optic cable. Alternately, the signal transmission media may include a second power connector in contact with the power supply voltage source to provide the power voltage to the second signal converter.

The first signal converter has a modulator that receives the signal and modulates a carrier signal and an electron-to-light converter. The electron-to-light converter is in communication with the modulator to receive the modulated carrier signal to further modulate a current through the electron-to-light converter to generate the modulated light signal. The electron-to-light converter is a light emitting diode or a laser diode.

The second signal converter has a light-to-electron converter to receive the modulated light signal and convert the light signal to a current that varies with the modulated carrier signal. The second signal converter also has a demodulator in communication with the light-to-electron converter to receive the current, the demodulator removing the carrier signal to reconvert the signal for transfer to the second connector. The light-to-electron converter is selected from the group of light-to-electron converters consisting of photoresistors, phototransistors, and photodiodes.

If the second connector is not an RCA connector, but a standard speaker connector, the signal transmission media has an amplification apparatus for the amplification of the reconverted signal. The reconverted signal is the transferred to said receiving apparatus, wherein said receiving apparatus is a transducer apparatus for reproduction of the signal.

The fiber optic cable in the preferred embodiment may as much as 1000 meters in length. The audio signals may be analog audio signal and digital audio signals.

DETAILED DESCRIPTION OF THE INVENTION

The signal transmission media of this invention has a connector such as an RCA connector that is inserted to a matching receiving connector of a preamplifier connected to an audio and/or video generation device such as a compact disc or digital video disc player. The preamplifier receives analog signals from the audio and/or video generation devices, conditions the analog signals for transmission to a final amplifier and thence to a reproduction device such as a speaker or display. An electron-to-light converter converts the analog signal to a light signal for transmission on a fiber optic cable connected to the electron-to-light converter. At an opposite end of the fiber optic cable, a light-to-electron converter recovers the analog signal. The analog signal is transferred through a connector, again an RCA connector, for transfer to the final amplifier and thence to the reproduction device (speaker or video display).

Figure 1:
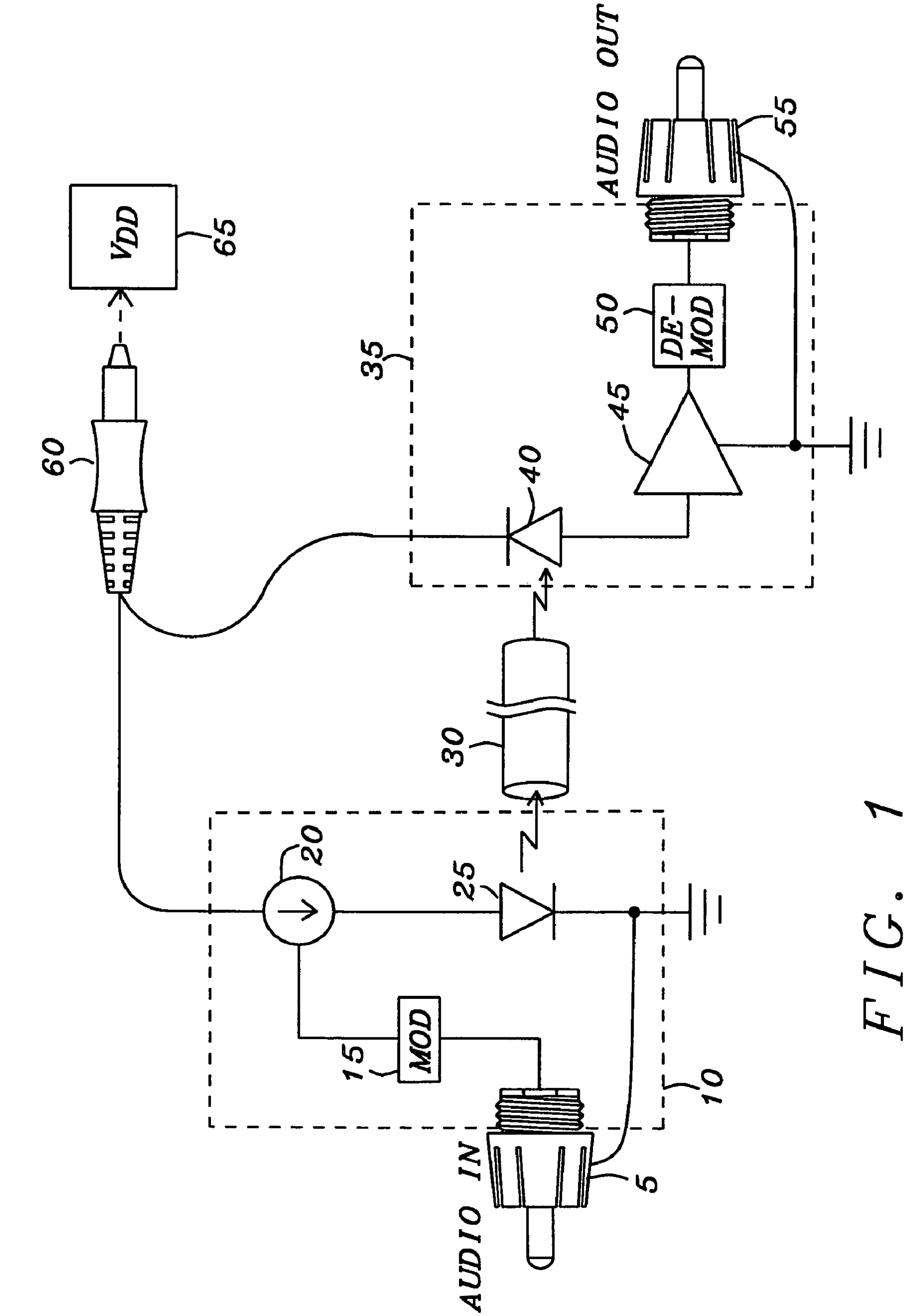
FIG. 1 is a schematic diagram of the signal transmission media of this invention.

Refer now to FIG. 1 for a more detailed description of the signal transmission media of this invention. The audio signal is transferred from the generation device through the RCA connector 5 to the electron-to-light converter 10. The electron-to-light converter has a modulator 15 which receives the audio signal from the RCA connector 5. The modulator 15 varies a current source 20. The current source 20 passes a current through light emitting devices such as a light emitting diode or a laser diode 25. The magnitude of the current through light emitting diode 25 determines the magnitude of the light signal emitted.

The modulator 15 may directly modulate the current source with the audio signal. Alternately, the a high frequency intermediate signal may be either amplitude modulated or frequency modulated with the audio signal and then used to vary the amplitude of the current source 20 and thus the magnitude of the light signal.

The light signal is transferred from the light emitting diode 25 to a fiber optic cable 30. The fiber optic cable is connected to the light-to-electron converter 35. The light-to-electron converter 35 receives the modulated light signal for conversion to recover the original audio signal. The light-to-electron converter 35 is connected to the RCA connector 55 to transfer the audio signal for reproduction.

The light-to-electron converter 35 has a photo-conversion device such as the photodiode 40. Alternate photo-conversion devices maybe photo-resistors or photo-transistors. The photodiode 40 is aligned to receive the modulated light signal from the fiber optic cable. The magnitude of a current through the photodiode 40 being dependent upon the magnitude of the light signal. The current through the photodiode 40 is the input signal to an amplifier 45 which amplifies and conditions a recovered version of the modulating signal. The recovered version of the modulating signal is applied to the demodulator 50. The demodulator 50 further conditions and recovers the original audio signal. The demodulator 50 may just apply filtering to remove transient noise collected in the transmission of the audio signal. Alternately, the demodulator 50 may remove the high frequency intermediate signal to recover the original audio signal.

The light-to-electron converter 35 is connected to the RCA connector 55, which is inserted to a mating RCA receiving connector in an amplifier or reproduction device (speaker). The recovered audio signal is transferred to the amplifier and thence to the speaker for reproduction.

The electron-to-light converter 10 and the light-to-electron converter 35 are connected to a power connector 60 that is inserted to a power supply voltage source 65. The power supply voltage source 65 provides the necessary voltage and current for the electron-to-light converter 10 and the light-to-electron converter 35. For relatively short distances of the fiber optic cable, a connective wiring is placed adjacent to the fiber optic cable 30 to distribute the necessary voltage and current to the electron-to-light converter 10 or the light-to-electron converter 35 at the end opposite the power connector 60. Alternately, a second power connector and second power supply voltage source maybe used if the length of the fiber optic cable 30 is too long to permit the connective wiring.

Figure 2A:
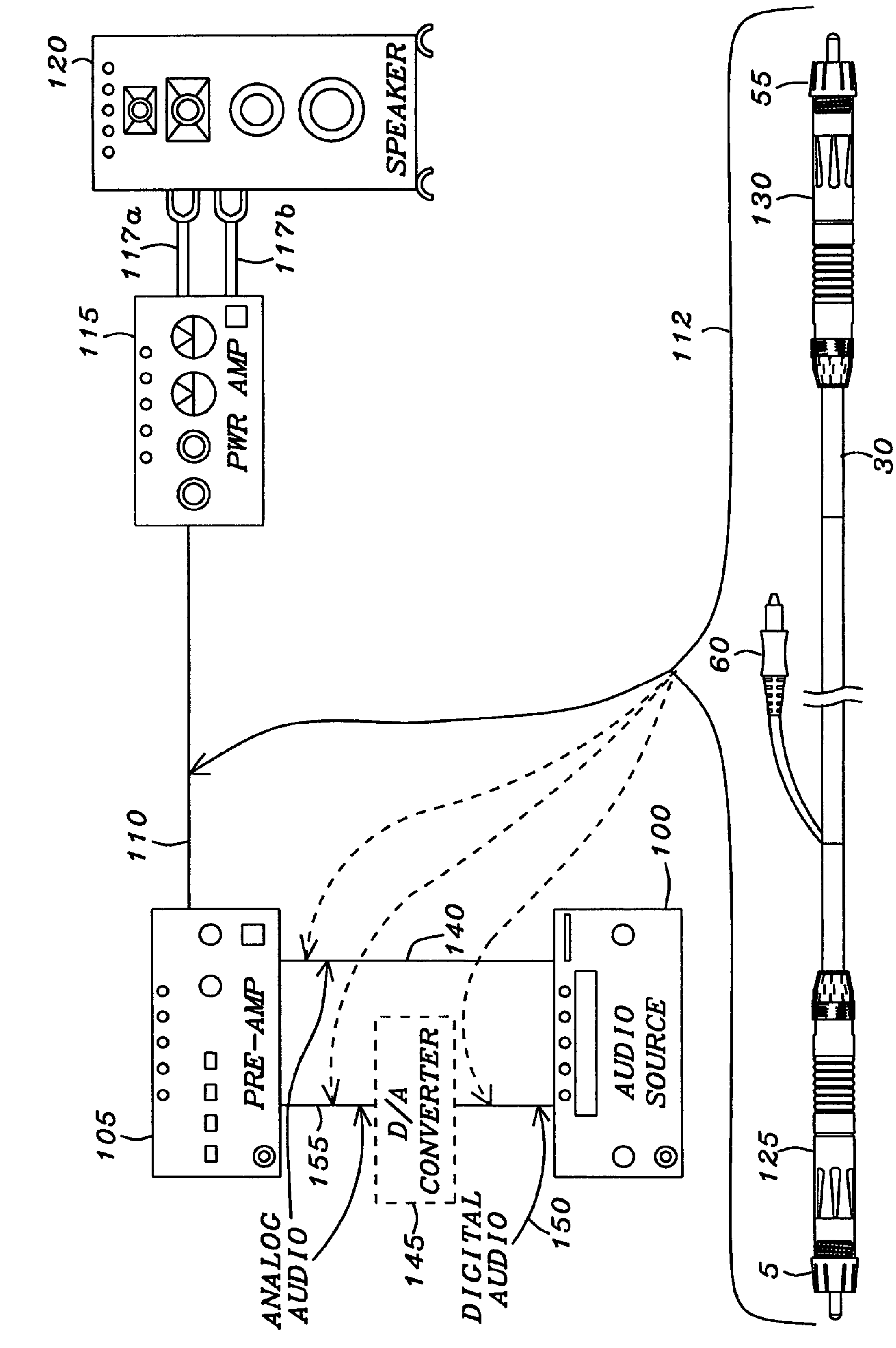
FIGS. 2*a* and 2*b* are diagrams of two embodiments of sound reproduction systems employing the signal transmission media of this invention.
Figure 2B:
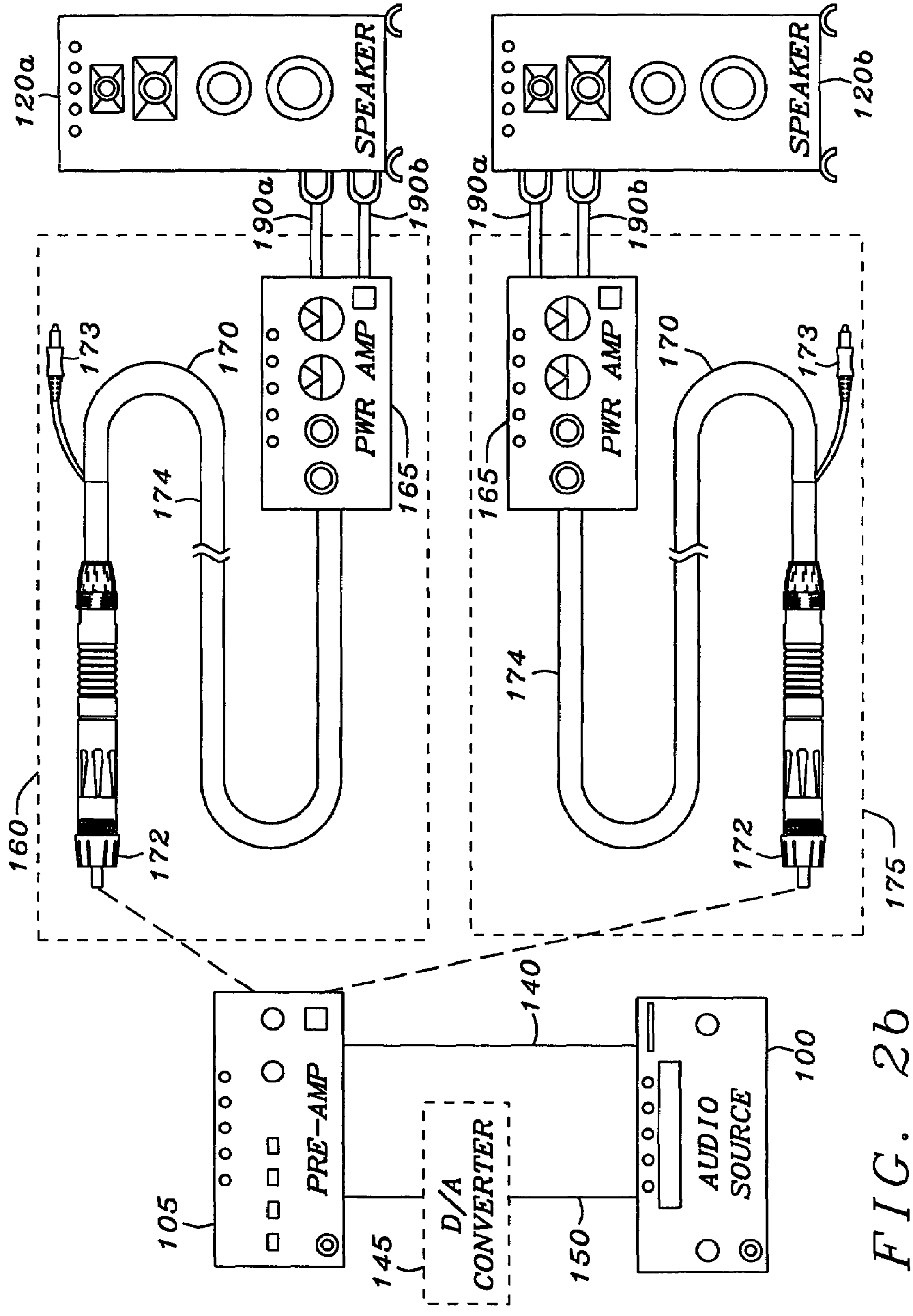

FIGS. 2*a* and 2*b* illustrate two embodiments of a signal transmission system employing the transmission media of this invention. The transmission system of this example is an audio reproduction system with an audio source 100. The audio source 100 maybe a compact disc, a digital video disc, or even a microphones and acoustic pickups for musical instruments. The audio source 100 optionally has an analog output connection 140 that is the applied to a pre-amplifier 105 which conditions and amplifies the audio signal. In the case of a compact disc or digital video disc, the audio source 100 may have an output connection 150 that provides digital audio signals and the pre-amplifier 105 may convert the digital audio signals to analog audio signals for transmission. The pre-amplifier 105 has an analog audio output connection 110 to final power amplifier 115 to transfer the audio signal to the power amplifier 115. The output connections 117*a* and 117*b* transfer the amplified audio signal to a transducer, in this embodiment a speaker 120.

The digital audio output connection 150 may alternately be connected to a digital-to-analog-converter 145. The digital-to-analog-converter 145 receives digital audio signals such as those that have been encoded to conform the Sony-Philips digital interface (SPDIF). This is a common encoding used in Compact Audio Disks and is known in the art. The digital-to-analog-converter 145 then converts the digital audio signals to an analog signal that is transferred through the output connection 155 of the digital-to-analog-converter 145 to the pre-amplifier 105.

The analog audio output connection 140 from the audio source 100, the analog audio output connection 110 from the pre-amplifier 105, the digital audio output connection 150 from the audio source 100, and the analog audio connection 155 from the digital-to-analog-converter 145 are optionally the transmission media of this invention as embodied by the audio cable 112.

The audio cable 112 of this invention has an RCA connector 5 that is inserted to a mating connector of the pre-amplifier 105. The RCA connector 5 is connected to the electron-to-light converter 10 of FIG. 1 that is concealed by the connector housing 125. The electron-to-light converter 10 is placed to transfer the modulated light signal to the fiber optic cable 30. The fiber optic cable 30 being physically secured to the RCA connector by the connector housing 125.

At an opposite end of the fiber optic cable, a connector housing 130 physically secures the fiber optic cable 30 to the RCA connector 55. The fiber optic cable 30 is placed to transfer the modulated light signal to the light-to-electron converter 35 of FIG. 1. The light-to-electron converter 35 of FIG. 1 is concealed by the connector housing 130. The RCA connector 55 is inserted to a mating connector of the power amplifier 115 to receive the recovered audio signal from the light-to-electron converter 35 of FIG. 1. The power amplifier 115 is connected to the speaker 120. The power amplifier 115 amplifies the audio signal to drive the speaker 120 to reproduce the sound signals generated by the audio source 100.

The power connector 60 is attached to a power supply voltage source to provide the necessary voltage and current for electron-to-light converter and the light-to-electron converter. As noted above, a second connector may be added at the opposite end of the fiber optic cable such that the light-to-electron converter has a separate power supply voltage source from that of the electron-to-light converter.

Referring to FIG. 2*b*, the second embodiment of the signal transmission system employing the transmission media of this invention has the audio source 100 with the analog output connection 140 and the digital audio output connection 150, the option digital-to-analog-converter 145 with the analog output connection 155, and the preamplifier 105, as described in FIG. 2*a*. In this embodiment, the pre-amplifier 105 has multiple output connectors to allow for multiple connections (two connections being illustrated, but an audio or video system may have more connections) to the speakers 120*a* and 120*b*. In this embodiment the transmission media 160 and 175 are fundamentally as described in FIG. 1, but now include the power amplifier.

The transmission media 160 and 175 each has an audio cable 170 with a connector housing 171. Enclosed in the connector housing is a electron-to-light converter 10 of FIG. 1 connected to the RCA connector 172. The RCA connector 172 is connected as described in FIG. 1 to the electron-to-light converter 10 which is then connected to the fiber optic cable 174. The fiber optic cable 174 is connected to the power amplifier 165. Integrated within the power amplifier 165 is a light-to-electron converter that is similar to the light-to-electron converter 35 of FIG. 1, except is not connected to an RCA connector. The light to electron converter is then connected to a power amplification circuit that amplifies the audio signal. The amplified audio signal is transferred from the power amplifier 165 through the speaker cable connections 190*a* and 190*b* to one of the speakers 120*a* and 120*b*. To maintain the quality of the audio signal as it is transferred to the speakers 120*a* and 120*b* the speaker cable connections 190*a* and 190*b* must have a length less than 0.2 m.

Figure 3:
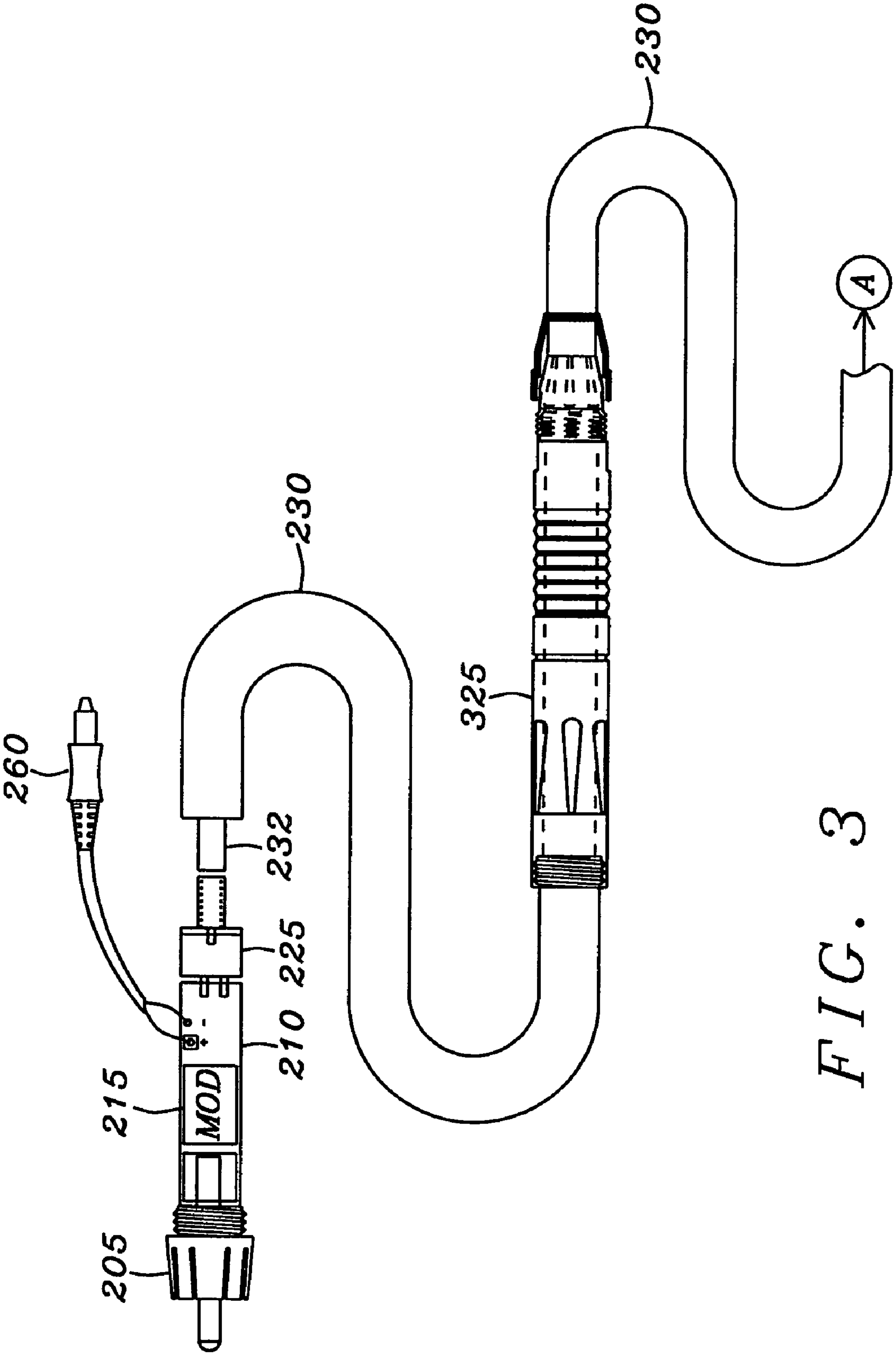
FIGS. 3 and 4 are diagrams of the signal transmission media of this invention.
Figure 4:
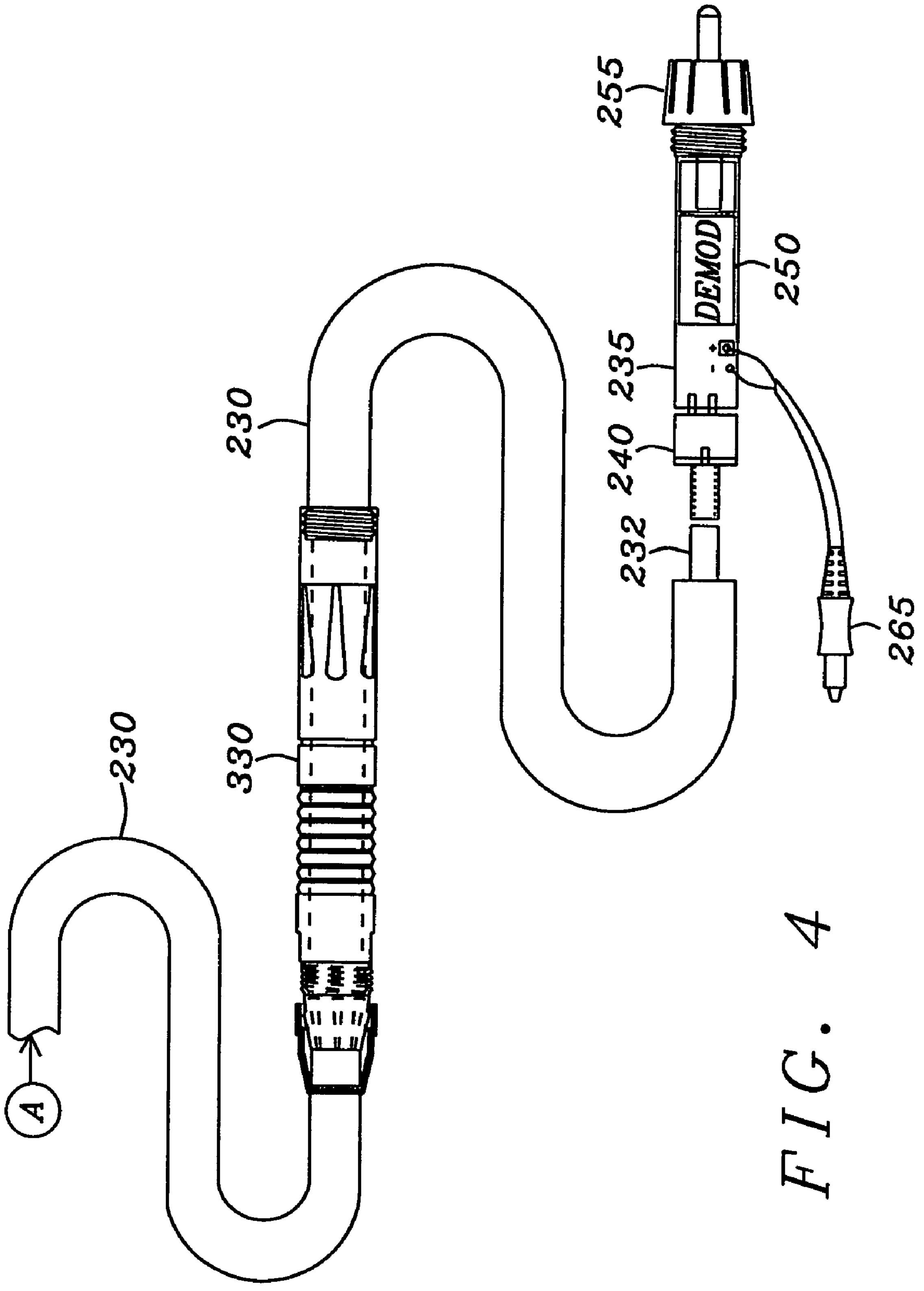

Refer now to FIGS. 3 and 4 for a discussion of the construction of the transmission media of this invention. The RCA connector 205 and its housing 325 are provided. The housing 325 is slid over the fiber optic cable 230 to expose the electron-to-light converter 210. The electron-to-light converter 210 is attached to the RCA connector 205 such that no cabling is employed. The electron-to-light converter is a printed circuit assembly that includes the modulator 215 connected to receive the analog signal from the RCA connector 205. The modulator 215 provides a signal to modulate the current through the light emitting diode or the laser diode 225 as described above. The core 232 of the fiber optic cable 230 is placed and aligned such that the modulated light signal passes to the fiber optic cable 230. The transmitting end of the transmission media is completed with the placing of the housing 325 over the electron-to-light converter 210 to secure the RCA connector 205 and the electron-to-light converter 210 to the fiber optic cable 230.

At the opposite end of the fiber optic cable 230 as shown in FIG. 4, the RCA connector 255 and its housing 330 are provided to be connected to the fiber optic cable 230. The housing 330 is slid over the fiber optic cable 230 to expose the light-to-electron converter 235. The light-to-electron converter 235 is attached to the RCA connector 255 such that no cabling is employed as described for the electron-to-light converter 210 and the RCA connector 205 above. A photo conversion device 240 such as photodiode, photo-resistor, or photo-transistor is aligned and secured with the core 232 of the fiber optic cable 230 to receive and convert the modulated light signal. The reconverted electronic signal is applied to the demodulator to recover the analog signal as described above. The recovered analog signal is transferred to the RCA connector. The receiving end of the transmission media is completed with the placing of the housing 330 over the light-to-electron converter 235 to secure the RCA connector 255 and the light-to-electron converter 235 to the fiber optic cable 230.

The electron-to-light converter 210 is connected to the power connector 260 which is then attached to a power supply voltage source to supply voltage and current to the electron-to-light converter 210. A separate connective wiring (not shown) maybe adjacent to the fiber optic cable 230 and connected to the light-to-electron converter 235 to provide voltage and current to the light-to-electron converter 235. Alternately, as shown in FIG. 4, the power connector 265 is connected to the light-to-electron converter 235 to be connected to a separate power supply voltage source to provide the voltage and current to the light-to-electron converter 235.

Figure 5:
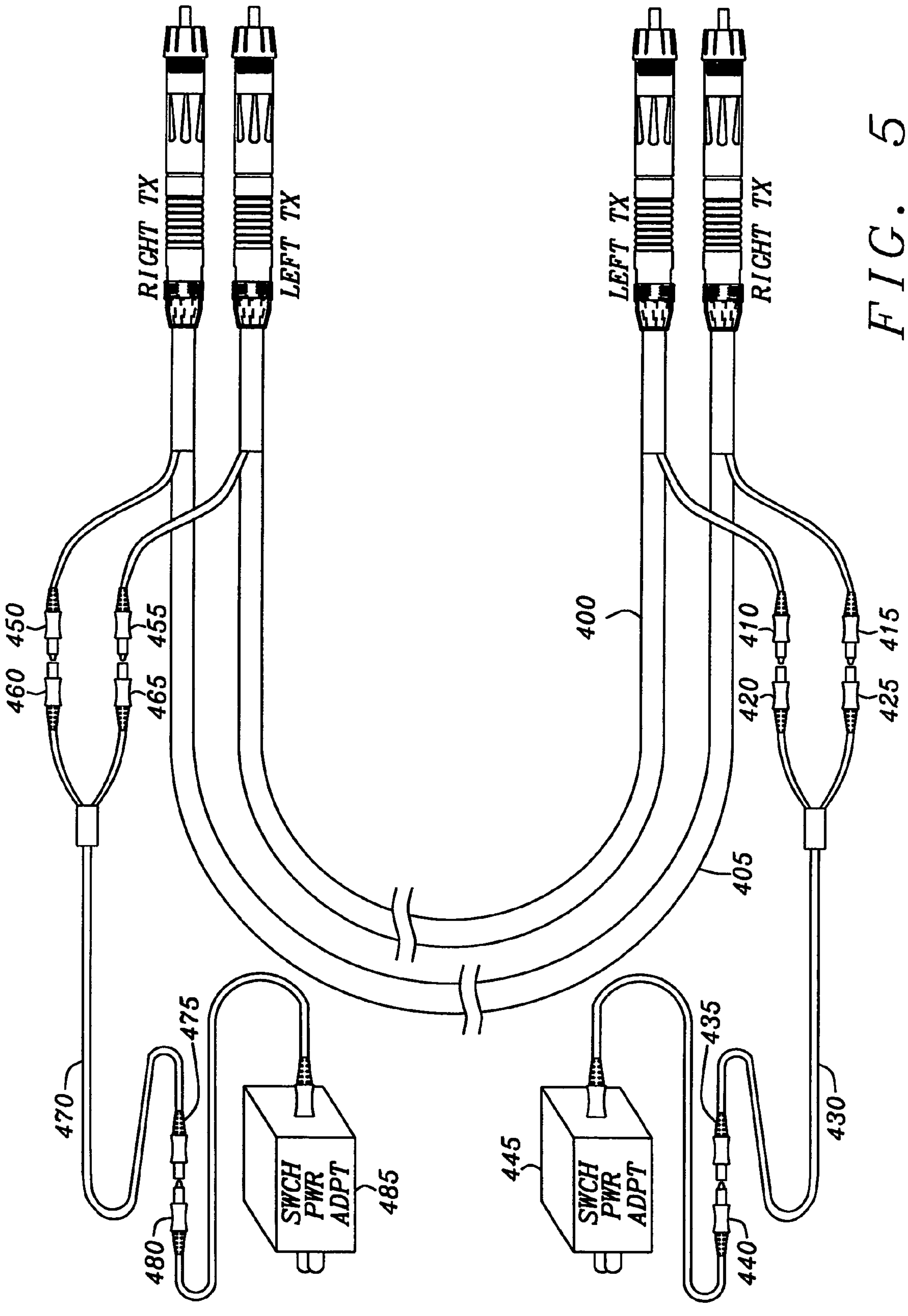
FIG. 5 is a diagram of multiple transmission media of this invention illustrating a power supply voltage source for distribution of a power voltage.

In many home entertainment and auditorium audio applications, there are multiple speakers. FIG. 5 shows an example of a stereo application for two speakers where the audio transmission cable 400 of this invention is provided for a left speaker and the audio transmission cable 405 is provided for the right speaker. The construction of the left and right audio transmission cables 400 and 405 is as described in FIGS. 3 and 4. The power connectors 410 and 415 are connected through the housing of the RCA connectors to the electron-to-light converter of the receiver end of the left and right audio transmission cables 400 and 405. The power connectors 410 and 415 are connected to the power connectors 420 and 425 of the "Y" cable 430. The connector 435 is attached to the connector 440 of the switched power supply voltage source 445. This allows multiple audio transmission cables to be attached to a single power supply voltage source 445. As described above, a connective power wire may optionally be a placed adjacent to the fiber optic cable of the transmission cables 400 and 405 to provide the necessary power supply voltage and current to the light-to-electron converter of the transmission cables 400 and 405. Alternately, the transmission cables 400 and 405 may have power connectors 450 and 455 that are connected through the housing of the RCA connectors to the electron-to-light converter of the receiver end of the transmission end of the left and right audio transmission cables 400 and 405. The power connectors 450 and 455 are connected to the power connectors 460 and 465 of the "Y" cable 470. The connector 475 is attached to the connector 480 of the switched power supply voltage source 485. This allows multiple audio transmission cables to be attached to a single power supply voltage source 485.

Returning to FIGS. 2*a* and 2*b*, the fiber optic audio cable may have a length of up to approximately 1000 meters. This essentially eliminates any limiting of the speaker locations, especially, for the outdoor concert venues or for very large auditoriums. The long transmission distance of fiber optic audio cable permits that the power amplifier 115 to be located essentially in the same location as the speakers to obtain the best sound quality. In fact there has been a recent trend toward building the power amplifier 115 within the speaker cabinet 120. The fiber optic transmission cable could permit an increase in this trend toward the integration of the power amplifier 115 and the speaker 120 within the same cabinetry. Alternately, the transmission media 160 and 175 of the second embodiment, as illustrated in FIG. 2*b*, with the integration of the power amplifier 165 with the audio cable 170 enables the use of standard audio speakers 120*a* and 120*b* that do not require special design requirements to include the power amplifier.

Further, the fiber optic cable 30 of the audio transmission media 110 of this invention has a better frequency response range than the conventional coaxial cable and can isolate the impedance between two devices to reduce the signal distortion. These characteristics make the sounds more relaxed, musical, detailed and transparent with a far greater sense of space around the stereo system, especially, for sounds at low and high frequency. Additionally, the fiber optic cable 30 is not interfered with by the electrical or magnetic fields for the long distance transmission. This permits better reproduction of the sound from the audio signal.

Referring back to FIGS. 3 and 4, the RCA connectors 205 and 255, as shown, may be connectors may be substituted with the XLR series audio connector manufactured by ITT Industries, Cannon, Santa Ana, Calif. and be in keeping with the intent of this invention. The XLR series audio connector has been accepted as a standard Audio Engineering Society, Inc. standard AES14-1992 (r2004).

While this invention has been particularly shown and described with reference to the preferred embodiments thereof, it will be understood by those skilled in the art that various changes in form and details may be made without departing from the spirit and scope of the invention.

The invention claimed is:

1. A signal transmission media for communication of an analog signal from an analog signal generation apparatus to an analog signal receiving apparatus comprising:

- a first connector in contact with said analog signal generation apparatus to receive said analog signal from said analog signal generation apparatus;
- a first connector housing into which said first connector is secured;
- a first signal converter inserted within said first connector housing and in communication with the first connector to acquire said analog signal and modulate a light signal with said analog signal;
- a fiber optic cable secured to said first connector housing and connected to transmit said light signal modulated with said analog signal; and
- a second signal converter connected to receive said light signal modulated with said analog signal from said fiber optic cable and demodulate said light signal to recover said analog signal for transfer to said receiving apparatus.

2. The signal transmission media of claim 1 wherein said first signal converter and said first connector have no external cabling between them.

3. The signal transmission media of claim 1 wherein said first connector is an RCA audio connector.

4. The signal transmission media of claim 1 further comprising a first power connector in contact with a power supply voltage source to provide a power voltage to said first signal converter.

5. The signal transmission media of claim 1 wherein said fiber optic cable is less than 1000 meters in length.

6. The signal transmission media of claim 1 wherein said first signal converter comprises:

a modulator that receives said analog signal and modulates a carrier signal; and an electron-to-light converter in communication with the modulator to receive said modulated carrier signal to further modulate a current through said electron-to-light converter to generate said light signal modulated with said analog signal.

7. The signal transmission media of claim 6 wherein electron-to-light converter is a light emitting diode or a laser diode.

8. The signal transmission media of claim 1 further comprising:

a second connector housing into which said second signal converter is inserted and secured; and a second connector secured to said second connector housing and connected to the second signal converter to receive said recovered analog signal and in contact with said amplification apparatus to transfer said recovered analog signal to the receiving apparatus.

9. The signal transmission media of claim 8 further comprising:

a first power connector in contact with a power supply voltage source to provide a power voltage to said first signal converter; and a connective wiring from said first power connector to said second signal converter to provide said power voltage to said second signal converter, said connective wiring being adjacent to said fiber optic cable.

10. The signal transmission media of claim 9 further comprising a second power connector in contract with the power supply voltage source to provide the power voltage to said second signal converter.

11. The signal transmission media of claim 8 wherein said second signal converter and said second connector have no external cabling between them.

12. The signal transmission media of claim 8 wherein said second connector is an RCA audio connector and said recovered analog signal is transferred to an amplification apparatus for amplification before transfer to said receiving apparatus, wherein said receiving apparatus is a transducer apparatus for reproduction of said analog signal.

13. The signal transmission media of claim 8 further comprising a power amplifier in communication with the second signal converter to receive and amplify said recovered analog signal and connected to said second connector.

14. The signal transmission media of claim 8 wherein said second signal converter comprises:

a light-to-electron converter to receive said light signal modulated with said analog signal and convert said light signal to a current that varies with said modulated carrier signal;

a demodulator in communication with the light-to-electron converter to receive the current, said demodulator removing said carrier signal to recover said analog signal for transfer to said second connector.

15. The signal transmission media of claim 14 wherein the light-to-electron converter is selected from the group of light-to-electron converters consisting of photoresistors, phototransistors, and photodiodes.

16. An audio signal transmission cable for communication of an analog audio signal from an analog audio signal transmission apparatus to an audio signal receiving apparatus comprising:

a first connector in contact with the analog audio signal transmission apparatus to receive said analog audio signal;

a first connector housing into which said first connector is secured;

a first signal converter inserted within said first connector housing and in communication with the first connector to acquire said analog audio signal, and to modulate a light signal with said analog audio signal;

a fiber optic cable secured to said first connector housing and connected to receive and transmit said modulated light signal; and a second signal converter connected to receive said modulated light signal and recover said analog audio signal from said modulated light signal for transfer to said receiving apparatus.

17. The audio signal transmission cable of claim 16 wherein the analog audio signal transmission apparatus is an audio signal source, a digital-to-analog converter, or an audio preamplifier.

18. The audio signal transmission cable of claim 16 wherein the analog audio signal receiving apparatus is the digital-to-analog converter, the audio preamplifier, or an audio amplifier.

19. The audio signal transmission cable of claim 16 wherein said first signal converter and said first connector have no external cabling between them.

20. The audio signal transmission cable of claim 16 wherein said first connector is an RCA audio connector.

21. The audio signal transmission cable of claim 16 further comprising a first power connector in contact with a power supply voltage source to provide a power voltage to said first signal converter.

22. The audio signal transmission cable of claim 16 wherein said first signal converter comprises:

a modulator that receives said analog audio signal and modulates a carrier signal; and an electron-to-light converter in communication with the modulator to receive said modulated carrier signal to further modulate a current through said electron-to-light converter to generate said modulated light signal.

23. The audio signal transmission cable of claim 22 wherein electron-to-light converter is a light emitting diode or laser diode.

24. The audio signal transmission cable of claim 16 further comprising:

a first power connector in contact with a power supply voltage source to provide a power voltage to said first signal converter; and a connective wiring from said first power connector to said second signal converter to provide said power voltage to said second signal converter, said connective wiring being adjacent to said fiber optic cable.

25. The audio signal transmission cable of claim 24 further comprising a second power connector in contact with the power supply voltage source to provide the power voltage to said first signal converter.

26. The audio signal transmission cable of claim 16 further comprising:

a second connector housing into which said second signal converter is inserted and secured; and a second connector secured to said second connector housing and connected to the second signal converter to receive said reconverted analog audio signal and in contact with said analog audio signal receiving apparatus to transfer said reconverted analog audio signal to the audio signal receiving apparatus.

27. The audio signal transmission cable of claim 26 wherein said second signal converter and said second connector have no external cabling between them.

28. The audio signal transmission cable of claim 26 wherein said second connector is an RCA audio connector and said reconverted analog audio signal is transferred to the amplification apparatus for amplification before transfer to a speaker.

29. The signal transmission media of claim 26 further comprising a power amplifier in communication with the second signal converter to receive and amplify said reconverted signal and connected to said second connector.

30. The audio signal transmission cable of claim 26 wherein said second signal converter comprises:

a light-to-electron converter to receive said modulated light signal and convert said light signal to a current that varies with said modulated carrier signal;

a demodulator in communication with the light-to-electron converter to receive the current, said demodulator removing said carrier signal to recover said analog audio signal for transfer to said second connector.

31. The audio signal transmission cable of claim 30 wherein the light-to-electron converter is selected from the group of light-to-electron converters consisting of photoresistors, phototransistors, and photodiodes.

32. The audio signal transmission cable of claim 16 wherein said fiber optic cable is less than 1000 meters in length.

33. A sound reproduction system comprising:

an audio signal transmission apparatus for adjusting and transferring an analog audio signal;

an audio signal receiving apparatus in communication with said analog audio signal transmission apparatus to receive said analog audio signal and further adjust said analog audio signal; and an audio signal transmission cable for communication of the analog audio signal from the audio signal transmission apparatus to the audio signal receiving apparatus comprising:

a first connector in contact with the audio signal transmission apparatus to receive said analog audio signal;

a first connector housing into which said first connector is secured;

a first signal converter inserted within said first connector housing and in communication with the first connector to acquire said analog audio signal, and modulate said light signal with said analog audio signal;

a fiber optic cable secured to said first connector housing and connected to receive and transmit said modulated light signal; and a second signal converter connected to receive said modulated light signal and recover said analog audio signal from said modulated light signal for transfer to said audio signal receiving apparatus.

34. The sound reproduction system of claim 33 wherein the audio signal transmission apparatus is an analog audio signal source, a digital-to-analog converter, or an audio preamplifier.

35. The sound reproduction system of claim 33 wherein the audio signal receiving apparatus is the digital-to-analog converter, the audio preamplifier, or an audio amplifier.

36. The sound reproduction system of claim 33 wherein said first signal converter and said first connector of the audio signal transmission cable have no external cabling between them.

37. The sound reproduction system of claim 33 wherein said first connector is an RCA audio connector.

38. The sound reproduction system of claim 33 wherein said audio signal transmission cable further comprises a first power connector in contact with a power supply voltage source to provide a power voltage to said first signal converter.

39. The sound reproduction system of claim 33 wherein said fiber optic cable is less than 1000 meters in length.

40. The sound reproduction system of claim 33 wherein said first signal converter comprises:

a modulator that receives said analog audio signal and modulates a carrier signal; and an electron-to-light converter in communication with the modulator to receive said modulated carrier signal to further modulate a current through said electron-to-light converter to generate said modulated light signal.

41. The sound reproduction system of claim 40 wherein electron-to-light converter is a light emitting diode or a laser diode.

42. The sound reproduction system of claim 33 wherein said audio signal transmission cable further comprises:

a first power connector in contact with a power supply voltage source to provide a power voltage to said first signal converter; and a connective wiring from said first power connector to said second signal converter to provide said power voltage to said second signal converter, said connective wiring being adjacent to said fiber optic cable.

43. The sound reproduction system of claim 42 wherein said audio signal transmission cable further comprises a second power connector in contact with the power supply voltage source to provide the power voltage to said first signal converter.

44. The sound reproduction system of claim 33 further comprising:

a second connector housing into which said second signal converter is inserted and secured; and a second connector secured to said second connector housing and connected to the second signal converter to receive said reconverted analog audio signal and in contact with said audio signal receiving apparatus to transfer said reconverted analog audio signal to the audio signal receiving apparatus.

45. The sound reproduction system of claim 44 wherein said second signal converter and said second connector of the audio signal transmission cable have no external cabling between them.

46. The sound reproduction system of claim 44 wherein said second connector is an RCA audio connector and said reconverted analog audio signal is transferred to the amplification apparatus for amplification before transfer to a speaker.

47. The sound reproduction system of claim 44 wherein the audio signal transmission cable further comprises a power amplifier in communication with the second signal converter to receive and amplify said reconverted signal and connected to said second connector.

48. The sound reproduction system of claim 44 wherein said second signal converter comprises:

a light-to-electron converter to receive said modulated light signal and convert said light signal to a current that varies with said modulated carrier signal;

a demodulator in communication with the light-to-electron converter to receive the current, said demodulator removing said carrier signal to recover said analog audio signal for transfer to said second connector.

49. The sound reproduction system of claim 48 wherein the light-to-electron converter is selected from the group of light-to-electron converters consisting of photoresistors, phototransistors, and photodiodes.

50. A method for forming audio signal transmission cable for communication of an analog audio signal from an audio signal transmission apparatus to an audio signal receiving apparatus comprising the steps of:

providing a first connector that is to be placed in contact with the audio signal transmission apparatus to receive said analog audio signal;

securing said first connector to a first connector housing;

inserting a first signal converter within said first connector housing;

placing said first signal converter in communication with the first connector to acquire said analog audio signal, and modulate a light signal with said analog audio signal;

securing a fiber optic cable to said first connector housing;

connecting said fiber optic cable to receive and transmit said modulated light signal; and connecting a second signal converter to receive said modulated light signal from said fiber optic cable and recover said analog audio signal from said modulated light signal for transfer to said audio signal receiving apparatus.

51. The method of claim 50 wherein the audio signal transmission apparatus is an analog audio signal source, a digital-to-analog converter, or an audio preamplifier.

52. The method of claim 50 wherein the audio signal receiving apparatus is the digital-to-analog converter, the audio preamplifier, or an audio amplifier.

53. The method of claim 50 wherein said first signal converter and said first connector have no external cabling between them.

54. The method for forming audio signal transmission cable of claim 50 wherein said first connector is an RCA audio connector.

55. The method for forming audio signal transmission cable of claim 50 further comprising the step of placing a first power connector in contact with a power supply voltage source to provide a power voltage to said first signal converter.

56. The method for forming audio signal transmission cable of claim 55 further comprising the steps of:

affixing a connective wiring from said first power connector to said second signal converter to provide said power voltage to said second signal converter; and placing said connective wiring adjacent to said fiber optic cable.

57. The method for forming audio signal transmission cable of claim 50 wherein said fiber optic cable is less than 1000 meters in length.

58. The method for forming audio signal transmission cable of claim 50 wherein said first signal converter comprises:

a modulator that receives said analog audio signal and modulates a carrier signal; and an electron-to-light converter in communication with the modulator to receive said modulated carrier signal to further modulate a current through said electron-to-light converter to generate said modulated light signal.

59. The method for forming audio signal transmission cable of claim 50 wherein electron-to-light converter is a light emitting diode or a laser diode.

60. The method for forming audio signal transmission cable of claim 50 further comprising the steps of:

placing a first power connector in contact with a power supply voltage source to provide a power voltage to said first signal converter;

affixing a connective wiring from said first power connector to said second signal converter to provide said power voltage to said second signal converter; and placing said connective wiring adjacent to said fiber optic cable.

61. The method for forming audio signal transmission cable of claim 60 further comprising the step of placing a second power connector in contact with the power supply voltage source to provide the power voltage to said first signal converter.

62. The method of claim 50 further comprising the steps of:

securing a second connector housing to said fiber optic cable;

inserting said second signal converter within said second connector housing;

securing a second connector to said second connector housing;

connecting a second connector to said second signal converter to receive said re-converted signal; and placing said second connector in contact with said audio signal receiving apparatus to transfer said reconverted analog audio signal to the amplification apparatus.

63. The method of claim 62 wherein said second signal converter and said second connector have no external cabling between them.

64. The method for forming audio signal transmission cable of claim 62 wherein said second connector is an RCA audio connector and said method further comprises the step of transferring said reconverted analog audio signal to the amplification apparatus for amplification before transfer to a speaker.

65. The method for forming audio signal transmission cable of claim 62 further comprising step of providing a power amplifier in communication with the second signal converter to receive and amplify said reconverted signal and connected to said second connector.

66. The method for forming audio signal transmission cable of claim 62 wherein said second signal converter comprises:

a light-to-electron converter to receive said modulated light signal and convert said light signal to a current that varies with said modulated carrier signal;

a demodulator in communication with the light-to-electron converter to receive the current, said demodulator removing said carrier signal to recover said analog audio signal for transfer to said second connector.

67. The method for forming audio signal transmission cable of claim 66 wherein the light-to-electron converter is selected from the group of light-to-electron converters consisting of photoresistors, phototransistors, and photodiodes.

68. An apparatus for forming audio signal transmission cable for communication of an analog audio signal from an audio signal transmission apparatus to an audio signal receiving apparatus comprising:

means for providing a first connector that is to be placed in contact with the audio signal transmission apparatus to receive said analog audio signal;

means for securing said first connector to a first connector housing;

means for inserting a first signal converter within said first connector housing;

means for placing said first signal converter in communication with the first connector to acquire said analog audio signal, modulate a light signal with said analog audio signal;

means for connecting a fiber optic cable to receive and transmit said modulated light signal; and means for connecting a second signal converter to receive said modulated light signal from said fiber optic cable and recover said analog audio signal from said modulated light signal for transfer to said audio signal receiving apparatus.

69. The apparatus for forming audio signal transmission cable of claim 68 wherein the transmission apparatus is an analog audio signal source, a digital-to-analog converter, or an audio preamplifier.

70. The apparatus for forming audio signal transmission cable of claim 68 wherein the receiving apparatus is the digital-to-analog converter, the audio preamplifier, or an audio amplifier.

71. The apparatus for forming audio signal transmission cable of claim 68 wherein said first signal converter and said first connector have no external cabling between them.

72. The apparatus for forming audio signal transmission cable of claim 68 wherein said second signal converter and said second connector have no external cabling between them.

73. The apparatus for forming audio signal transmission cable of claim 68 wherein said first connector is an RCA audio connector.

74. The apparatus for forming audio signal transmission cable of claim 68 wherein said second connector is an RCA audio connector.

75. The apparatus for forming audio signal transmission cable of claim 68 further comprising a means for providing a power amplifier in communication with the second signal converter to receive and amplify said reconverted signal and connected to said second connector.

76. The apparatus for forming audio signal transmission cable of claim 68 further comprising means for placing a first power connector in contact with a power supply voltage source to provide a power voltage to said first signal converter.

77. The apparatus for forming audio signal transmission cable of claim 68 wherein said fiber optic cable is less than 1000 meters in length.

78. The apparatus for forming audio signal transmission cable of claim 68 wherein said first signal converter comprises:

a modulator that receives said analog audio signal and modulates a carrier signal; and an electron-to-light converter in communication with the modulator to receive said modulated carrier signal to further modulate a current through said electron-to-light converter to generate said modulated light signal.

79. The apparatus for forming audio signal transmission cable of claim 78 wherein electron-to-light converter is a light emitting diode.

80. The apparatus for forming audio signal transmission cable of claim 68 further comprising:

means for securing a second connector housing to said fiber optic cable;

means for inserting said second signal converter within said second connector housing;

means for securing a second connector to said second connector housing;

connecting a second connector to said second signal converter to receive said re-converted signal; and means for placing said second connector in contact with said analog audio signal receiving apparatus to transfer said reconverted analog audio signal to the amplification apparatus.

81. The apparatus for forming audio signal transmission cable of claim 80 wherein said second signal converter comprises:

a light-to-electron converter to receive said modulated light signal and convert said light signal to a current that varies with said modulated carrier signal;

a demodulator in communication with the light-to-electron converter to receive the current, said demodulator removing said carrier signal to recover said analog audio signal for transfer to said second connector.

82. The apparatus for forming audio signal transmission cable of claim 81 wherein the light-to-electron converter is selected from the group of light-to-electron converters consisting of photoresistors, phototransistors, and photodiodes.

83. The apparatus for forming audio signal transmission cable of claim 68 further comprising the steps of:

means for placing a first power connector in contact with a power supply voltage source to provide a power voltage to said first signal converter;

means for affixing a connective wiring from said first power connector to said second signal converter to provide said power voltage to said second signal converter; and means for placing said connective wiring adjacent to said fiber optic cable.

84. The apparatus for forming audio signal transmission cable of claim 83 further comprising means for placing a second power connector in contact with the power supply voltage source to provide the power voltage to said first signal converter.

* * * * *